United States Patent
Weber

(10) Patent No.: US 12,492,912 B2
(45) Date of Patent: Dec. 9, 2025

(54) METHOD FOR PROJECTING AT LEAST ONE LIGHT PATTERN INTO A VEHICLE ENVIRONMENT AND VEHICLE HAVING AT LEAST ONE PROJECTOR

(71) Applicant: MERCEDES-BENZ GROUP AG, Stuttgart (DE)

(72) Inventor: Hanno Weber, Kirchheim/Teck (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 93 days.

(21) Appl. No.: 18/578,411

(22) PCT Filed: Jun. 8, 2022

(86) PCT No.: PCT/EP2022/065539
§ 371 (c)(1),
(2) Date: Jan. 11, 2024

(87) PCT Pub. No.: WO2023/285037
PCT Pub. Date: Jan. 19, 2023

(65) Prior Publication Data
US 2024/0318973 A1    Sep. 26, 2024

(30) Foreign Application Priority Data
Jul. 12, 2021    (DE) ...................... 10 2021 003 558.5

(51) Int. Cl.
*G01C 21/36*    (2006.01)
*F21S 45/00*    (2018.01)
(Continued)

(52) U.S. Cl.
CPC ............ *G01C 21/365* (2013.01); *F21S 45/00* (2018.01); *G01C 21/3423* (2013.01); *B60Q 1/16* (2013.01); *B60R 1/1207* (2013.01)

(58) Field of Classification Search
CPC ... G01C 21/365; G01C 21/3423; F21S 45/00; B60Q 1/16; B60R 1/1207
(Continued)

(56) References Cited

U.S. PATENT DOCUMENTS 9,992,465 B1 *   6/2018   Schreiber ............. H04N 9/3194
10,184,802 B2 *  1/2019   Schreiber ............. H04N 9/3185
(Continued)

FOREIGN PATENT DOCUMENTS

CN       110260878 A       9/2019
DE    102013009873 A1     12/2013
(Continued)

OTHER PUBLICATIONS

International Search Report and Written Opinion mailed Oct. 31, 2022 in related/corresponding International Application No. PCT/EP2022/065539.
(Continued)

*Primary Examiner* — Adam D Tissot
(74) *Attorney, Agent, or Firm* — PATENT PORTFOLIO BUILDERS PLLC

(57) ABSTRACT

A method for projecting a light pattern into a vehicle environment using a vehicle projector involves the light pattern having navigation instructions for continued navigation in the form of a route to be selected for reaching a navigation target, in order to point a person in the direction of the navigation target after parking the vehicle.

11 Claims, 2 Drawing Sheets

(51) Int. Cl.
*G01C 21/34* (2006.01)
*B60Q 1/16* (2006.01)
*B60R 1/12* (2006.01)

(58) Field of Classification Search
USPC .......................................................... 701/433
See application file for complete search history.

(56) References Cited

U.S. PATENT DOCUMENTS

| | | | |
|---|---|---|---|
| 2008/0198372 A1* | 8/2008 | Pan | F21S 41/645 |
| | | | 356/121 |
| 2017/0291529 A1 | 10/2017 | Schneider et al. | |
| 2018/0004020 A1* | 1/2018 | Kunii | G03B 21/12 |
| 2021/0140781 A1 | 5/2021 | Fujita et al. | |
| 2023/0331087 A1 | 10/2023 | Kunii et al. | |

FOREIGN PATENT DOCUMENTS

| | | | |
|---|---|---|---|
| DE | 102013012891 A1 | 2/2015 | |
| DE | 102018000275 A1 | 8/2018 | |
| DE | 102017210801 A1 | 9/2018 | |
| DE | 102018120330 A1 | 2/2019 | |
| JP | 2007001440 A | 1/2007 | |
| JP | 2017087876 A | 5/2017 | |
| WO | WO-2006120850 A1 * | 11/2006 | ........... G09B 29/102 |
| WO | 2016163294 A1 | 10/2016 | |
| WO | 2021048908 A1 | 3/2021 | |

OTHER PUBLICATIONS

Office Action created Mar. 29, 2022 in related/corresponding DE Application No. 10 2021 003 558.5.

Office Action dated Nov. 12, 2024 in related/corresponding JP Application No. 2023-576062.

\* cited by examiner

METHOD FOR PROJECTING AT LEAST ONE LIGHT PATTERN INTO A VEHICLE ENVIRONMENT AND VEHICLE HAVING AT LEAST ONE PROJECTOR

BACKGROUND AND SUMMARY OF THE INVENTION

Exemplary embodiments of the invention relate to a method for projecting at least one light pattern into a vehicle environment using at least one projector comprised by a vehicle and to a vehicle that projects at least one light pattern into a vehicle environment using at least one projector.

Using modern navigation systems, people today can comfortably and easily get their bearings. Using route guidance, a person is thus in the position to find an unfamiliar location with a vehicle reliably and without needing to manually plan a corresponding route themselves, for example using a map. In addition, the person does not have to learn a corresponding route. Corresponding navigation systems can be permanently integrated into a vehicle, or also be designed as a mobile device.

However, a journey often ends with the vehicle not in an immediate environment of the target location, and instead at some distance from the latter. A possible cause is a lack of free parking places in the region of the target location. A person driving a vehicle must thus use a free parking space before reaching the target location, or drive past the target location and look for a free parking space beyond the target location, in particular in towns with a poor parking situation.

If the person driving the vehicle has then found a suitable parking space, and gets out of the vehicle to get to the target location on foot, the person driving the vehicle must get their bearings again to find their way from the parked location of the vehicle to the target location. The longer they have had to look for a free parking space and the further the latter is from the actual target location, the more complicated it is for them to navigate the route on foot following the journey in the vehicle.

In particular when using a vehicle-integrated navigation device, no further navigation instructions are available after leaving the vehicle, which makes it more difficult to find the quickest route to the target location. To continue the navigation, the person driving the vehicle can then use their smartphone. However, the person driving the vehicle has to program the target into their smartphone again, which is associated with an increased time expenditure. If the person driving the vehicle is in a time-critical situation, e.g. on the way to an appointment, valuable time is thus lost.

Methods and devices for projecting light patterns into a vehicle environment are known from the general prior art. DE 10 2018 120 330 A1 thus discloses a method for image protection in vehicles. A vehicle having corresponding projectors projects symbols into the vehicle environment depending on a trajectory of the vehicle. Such a symbol can, for example, comprise an indication as to whether the vehicle is controlled autonomously or manually. The symbol can also comprise features relating to the immediate surroundings such as a current signal of a traffic light, for example in order to make a person looking down at their smartphone aware that the traffic light is on red and that the vehicle projecting the light pattern is turning in front of the person looking at the smartphone. The symbols projected from the vehicle into the environment are orientated corresponding to the target objects to which they apply.

An assistance system for a vehicle is further known from DE 10 2018 000 275 A1. The assistance system makes it possible to control vehicle headlights to light up a navigation target in order to make it easier for a person driving a vehicle to be able to locate the target object of their route guidance particularly easily. Thus, for example, the person driving the vehicle does not first need to check the house numbers of different buildings to find their target location. However, lighting up the navigation target requires the vehicle to be located within visual range of the target location or of the target object.

Exemplary embodiments of the present invention are directed to an improved method for projecting at least one light pattern into a vehicle environment using at least one projector comprised by a vehicle, using which a person driving the vehicle is particularly reliably and comfortably guided to a navigation target after parking their vehicle.

In a method for projecting at least one light pattern into a vehicle environment using at least one projector comprised by a vehicle, according to the invention, the light pattern comprises navigation instructions for continued navigation in the form of a route to be selected for reaching a navigation target in order to point a person driving the vehicle in the direction of the navigation target after parking the vehicle.

The method according to the invention particularly conveniently makes it possible for the person to reliably reach the navigation target of a navigation carried out during the use of the vehicle, even after the vehicle has been parked. Thanks to the navigation instructions, the person is thus in the position to quickly and easily select the most suitable route to reach the navigation target on foot. Suitable means that the route to be taken on foot for example has a particularly short route length and/or can be followed in a particularly short amount of time. It is of no importance whether the vehicle is located within visual range of the target object. This makes it possible for the person to reliably find a route even if they park their vehicle in a parking space before they reach their navigation target, in visual range of the navigation target or after passing the navigation target. In addition, the person no longer needs to use their smartphone or a similar mobile end device to find their way, whereby they save time.

An advantageous development of the method provides that text, at least one symbol and/or at least one map is projected into the vehicle environment with the light pattern. Using text, symbols and/or a map, the route to be selected to reach the navigation target can be grasped particularly intuitively and thus in a way which can be easily understood by the person. For example, instructions can be emitted in text form, e.g., direction information such as "left", "straight on", "around the corner", distance information such as "in 100 meters" or the like, or instructions such as "start", "target", "cross crossroads", street names, house numbers or the like.

As a symbol, symbols indicating directions such as arrows can be depicted, or also pictograms, for example in the form of a house, a factory, a street, a target marker, a start marker, a target flag, or the like.

Particularly preferably, a map is projected into the vehicle environment. Using a map, the person can particularly quickly grasp which route they must take to reach the navigation target. The map can be abstracted to any degree. The map can either be designed in detail and comprise all relevant streets, buildings in addition to street names and house numbers, or the map can comprise only the route to be selected by the person. In particular, the map is limited to as small as possible a map section, at the edges of which the (parked) vehicle and the navigation target are located. The depiction of irrelevant information is thus avoided, which makes it easier for the person to intuitively understand the route to be selected.

Corresponding to a further advantageous embodiment of the method, the light pattern is projected onto a base surface. By projecting the light pattern onto a base surface such as the ground on which the vehicle is parked, it is ensured that the light pattern can also be cast into the vehicle environment in different situations. If there are no vertical projection surfaces, such as house walls, available, and/or if the vehicle is parked in a parking space such that further vehicles are located directly in front of and behind the vehicle, an uninterrupted projection of the light pattern onto the base surface is thus still possible. The base surface can have any structure. For example, it can be asphalt, curbstones, gravel, or the like. In addition, the person also moves onwards on the base surface, whereby they can for example locate themselves more easily in the map when using a light pattern with a map.

A further advantageous embodiment of the method further provides that at least a part of a light pattern is animated. For example, individual light pattern segments such as text components, individual symbols and/or map portions can flash, move, or change any dynamic such as a brightness, a contrast and/or their color. Individual parts of the light pattern can also change their size. For example, a map of the more immediate vehicle environment can be projected into the vehicle environment, the route going from the person to the navigation target can be highlighted more brightly and an arrow that is shining and/or flashing particularly brightly on this route can move along the route. Potential danger points can also be highlighted, e.g., a location at which the person has to cross a street, for example at a traffic light or at a pedestrian crossing. In this case, a corresponding region of the map can, for example, flash red.

Corresponding to a further advantageous embodiment of the method, a headlight of the vehicle and/or a projector integrated into a wing mirror of the vehicle is used to project at least one light pattern into the vehicle environment. If vehicle headlights are used for projection, then separate projectors do not need to be provided, because vehicle headlights are present in any case. If, however, the vehicle is parked in a narrow parking space, then in some instances, no light pattern with a sufficient perceptibility for the person can be projected into the environment by means of the vehicle headlight, because a light beam path is blocked by a further vehicle parking in front of the vehicle.

Using projectors integrated into the wing mirror of the vehicle, however, a perceptible light pattern can be cast into the vehicle environment even in demanding parking situations. The projectors can be integrated into a corresponding wing mirror at any location. For example, the projectors can be integrated into a wing mirror on an underside of the latter and be aligned in the direction of a base surface.

Different technologies can be used to project the light pattern. For example, the vehicle headlights and/or the projectors can comprise lasers or other lighting means such as LEDs, fluorescent tubes, halogen bulbs, or the like. In addition to at least one lighting means, a corresponding projector typically comprises further components such as mirrors, lenses, filters, actuators, and the like.

A further advantageous embodiment of the method further provides that a headlight used for projection is designed as a matrix headlight. Matrix headlights, also described as high-resolution pixel headlights, allow high-resolution images to be projected into the vehicle environment. By activating or deactivating individual lighting means, or pixels, light patterns of any shape can then be generated. In general, however, a headlight of the vehicle can, for example, also have so-called micro-lenses and/or micro-mirrors for targeted deflection of light beams. The micro-lenses or micro-mirrors can be arranged in a field, also known as an array.

Corresponding to a further advantageous embodiment of the method, the light pattern is aligned in a targeted manner in relation to the vehicle environment, such that the light pattern is projected into the vehicle environment with a fixed orientation. By aligning the light pattern in a targeted manner in relation to the vehicle environment, orientation for the person can be improved. Thus, for example, when the light pattern is in the form of a map, the map can be aligned in relation to the environment such that the cardinal directions of the map coincide with the actual cardinal directions. The components included in the map, such as streets, thus correspond to an actual orientation.

A further advantageous embodiment of the method further provides that when at least one projector integrated into a wing mirror is used to project the light pattern, a door opening angle of a vehicle door to which the wing mirror is connected is taken into account in the targeted alignment of the light pattern in relation to the vehicle environment. If the door opening angle were to not to be taken into account, the alignment of the light pattern in relation to the environment would change when opening and closing the vehicle door. The person could thus no longer intuitively grasp the route to be selected. As the door opening angle of the vehicle door is compensated for, however, the light pattern is projected into the vehicle environment corresponding to the determined orientation, even when the door is open, is closed or is being moved.

Preferably, the door opening angle is recorded by means of an angle sensor and/or by evaluating camera images generated with a camera integrated into the wing mirror. Different technologies can be used to design the angle sensor, such as the use of magnets and/or potentiometers. A corresponding angle sensor can be arranged at any location between the vehicle and the vehicle door and be connected to these. Due to the provision of cameras, however, it is not required to use moving parts or sensors, which makes it possible to reliably record a door opening angle. Thus, for example, angle sensors using a potentiometer can wear out over their lifespan, which causes the angle to be erroneously recorded. This can be avoided by using cameras to record a door opening angle. Camera images generated by suitable cameras can be evaluated on any computer in the vehicle.

In a vehicle having at least one projector, a navigation device, and a computer, according to the invention, the projector, the navigation device, and the computer are equipped to carry out a method as previously described. The vehicle can be any vehicle, e.g. a passenger car, HGV, transporter, bus, or the like. By means of the navigation device, a route is calculated, which a person drives with the vehicle to reach a navigation target from a starting point. If the person then parks their vehicle at a certain distance from the actual navigation target, they are in the position to quickly, easily, and intuitively reach the navigation target on foot using the method according to the invention and the vehicle according to the invention.

The navigation device thus records the location at which the vehicle is parked, and, using the navigation instructions projected into the vehicle environment, shows the person what route they still need to cover on foot to reach the actual navigation target. The navigation device can be a navigation system permanently integrated into the vehicle. It can also be a mobile device, such as a smartphone or a mobile navigation device, mostly referred to as a "satnav". To determine a geo-position of the vehicle or of the navigation device, a global satellite navigation system such as GPS, Beidou, Galileo or the like can be used. The computer can be integrated into the navigation device, the projector, or even into the vehicle. For example, the computer can be a central on-board computer, a telematics unit, or another control device of a vehicle subsystem. Control commands for controlling the at least one projector are generated using the computer or a separate computer.

Further advantageous embodiments of the method according to the invention and of the vehicle also result from the exemplary embodiments, which are described in more detail in the following with reference to the figures.

BRIEF DESCRIPTION OF THE FIGURES

Here.

DETAILED DESCRIPTION

Figure 1:
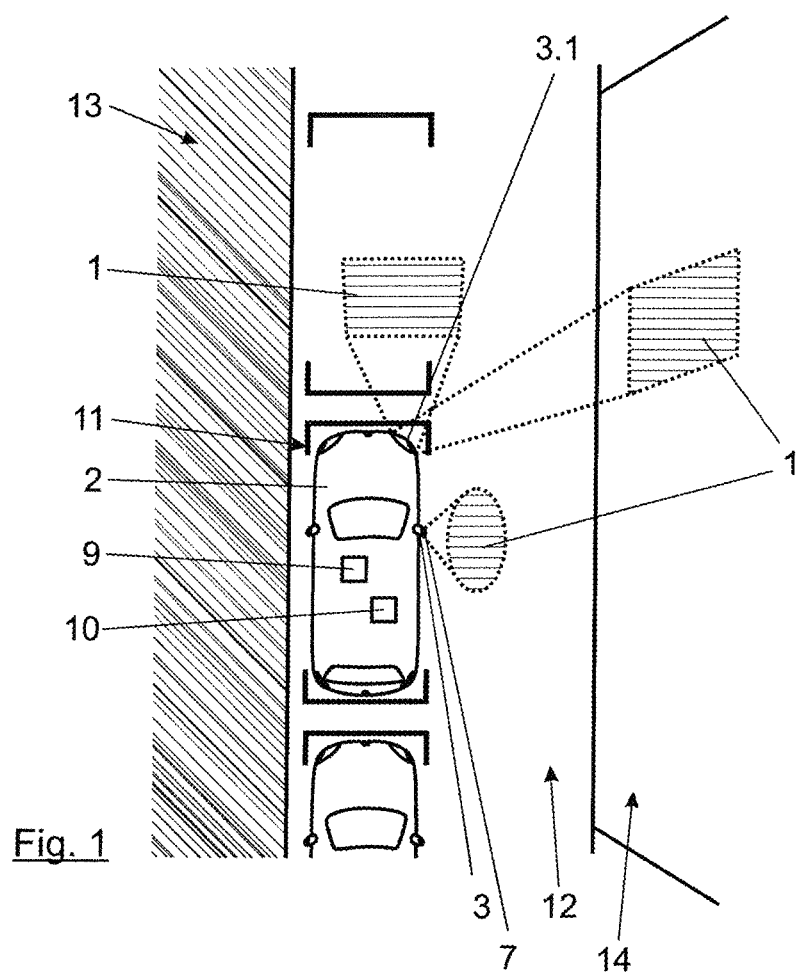
FIG. 1 shows an aerial view of a parked vehicle according to the invention, which projects navigation instructions for continued navigation into a vehicle environment.

FIG. 1 shows an aerial view of a vehicle 2 according to the invention, which has been parked in a free parking space 11. This parking space is a parking space 11 in a town. The parking space 11 is thus located on a pavement 12 between a street 13 and a house wall 14.

Figure 2:
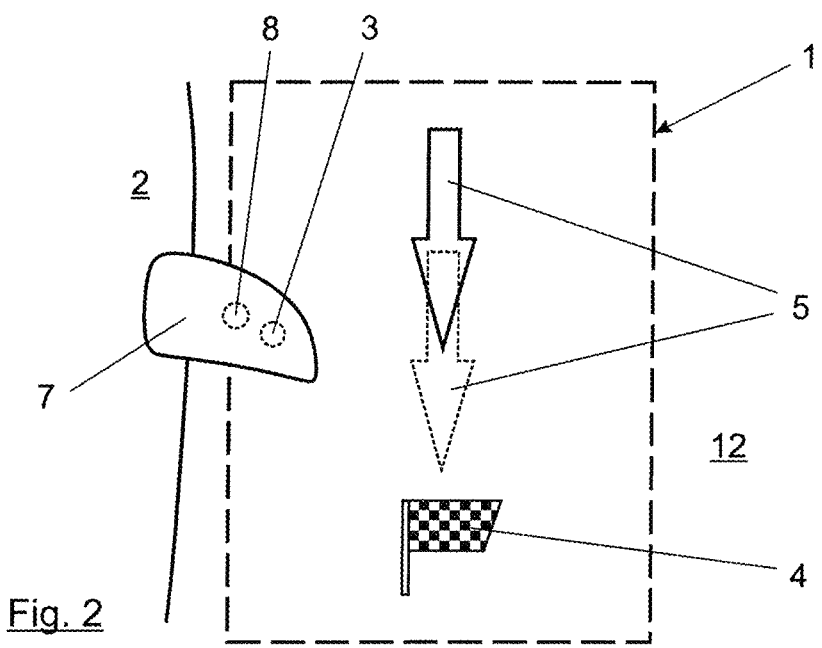
FIG. 2 shows a detailed view of simple navigation instructions.
Figure 3:
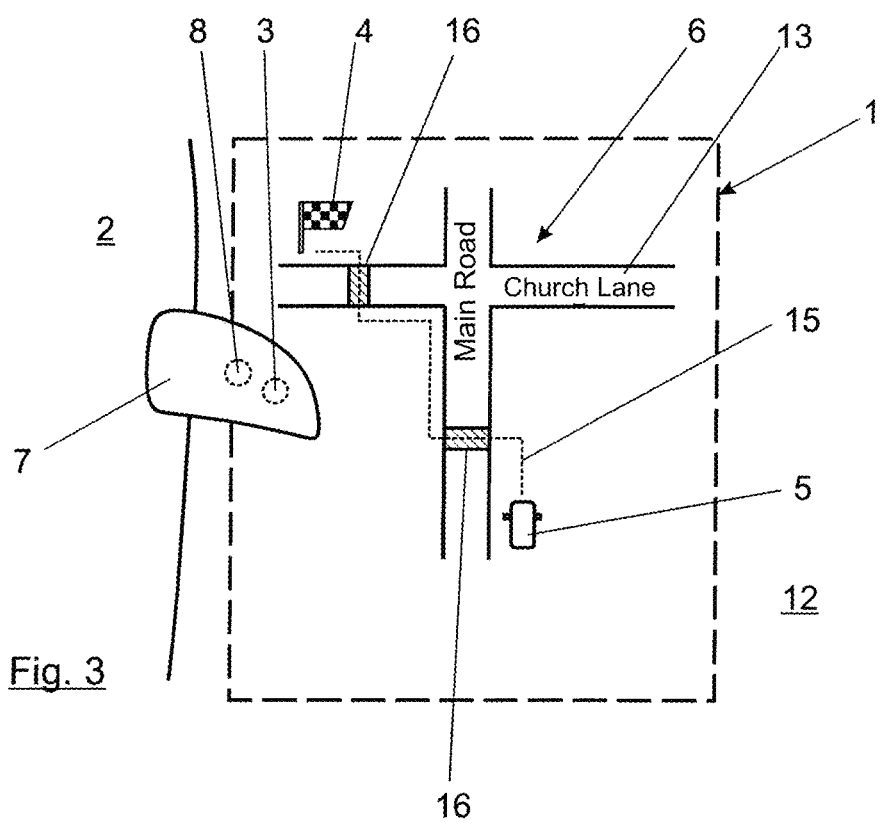
FIG. 3 shows a detailed view of complex navigation instructions.

A person driving the vehicle 2 travels with the vehicle 2 from a start location to a navigation target 4, which is depicted with a symbol in FIGS. 2 and 3. However, there are no free parking spaces available in the immediate proximity of the navigation target 4, and thus the person driving the vehicle has parked their vehicle 2 in the free parking space 11. In order to reach the navigation target 4, however, the person most now go the rest of the route on foot. The further away the free parking space 11 is from the navigation target 4, and the more labyrinthine the town, the more difficult it is for the person to find their way. In addition, after parking the vehicle 2 in the free parking space 11, they must first get their bearings in order to find out in which direction the actual navigation target 4 is now located.

In order to make it easier for the person to reach the navigation target 4 after parking the vehicle 2, the vehicle 2 according to the invention comprises at least one projector 3 for projecting navigation instructions into a vehicle environment, a navigation device 9 for finding routes, and a computer 10 for evaluating sensor signals, route calculation and/or controlling the at least one projector 3. The computer 10 can also be integrated into the navigation device 9.

A projector 3 can, for example, be integrated into a wing mirror 7 of the vehicle 2 or can also be formed by a headlight 3.1 of the vehicle 2. Using such a projector, a light pattern 1 is cast into the vehicle environment, whereby the light pattern 1 comprises the navigation instructions for continued navigation. The navigation instructions themselves comprise a route to be selected by the person in order to reach the navigation target 4.

The light pattern 1 can be cast onto a base surface in front of, next to, and/or behind the vehicle. It is generally also possible for the light pattern 1 to be cast onto vertical surfaces such as the house wall 14. In the example in FIG. 1, the vehicle 2 casts the light pattern 1 in front of itself with only its right front headlight 3.1. However, it is generally also possible for both of the vehicle headlights 3.1 to be used to project the light pattern 1. A particularly large light pattern 1 can thus be generated. If, however, a further vehicle (not depicted here) parks in front of the vehicle 2, no light pattern 1 that can be perceived by the person can be cast into the environment. Using a projector 3 integrated into a wing mirror 7, however, the perceptibility of the light pattern 1 for the person can also be ensured in such a situation. In FIG. 1, a light pattern 1 is generated with only one projector 3 integrated into the right wing mirror 7 of the vehicle 2. In general, such a light pattern 1 can also be generated with a projector 3 integrated into the left wing mirror 7. In the example in FIG. 1, however, this light pattern has been cast onto the road 13, which would require the person to stand in the region of the road 13 to observe the corresponding light pattern 1 (not depicted). They would thus influence moving traffic, or even run the risk of becoming involved in an accident. It is thus preferable to project the light pattern 1 in the direction of the pavement 12 or of the house wall 14. In general, the vehicle 2 can also have projectors 3 at further areas. For example, a projector 3 can also be integrated into a bumper, a door, a boot lid, or the like.

Using the light pattern 1 or the navigation instructions comprised by the light pattern 1, the person is pointed in the direction of the navigation target 4 originally to be reached with the vehicle 2. The person can thus understand particularly quickly and easily in which direction the navigation target 4 is located, and move in the direction of the navigation target 4 on foot.

FIG. 2 shows a detailed view of a light pattern 1. A section of the vehicle 2 with a corresponding wing mirror 7 are depicted. The projector 3 is integrated into the wing mirror 7, for example on an underside. The wing mirror 7 additionally comprises a camera 8 as well as the projector 3. Using the camera 8, a base surface and a section of the vehicle 2 are recorded, whereby it can be determined via an orientation of the vehicle 2 and of the base surface in camera images generated by the camera 8 at what door opening angle a vehicle door comprising the wing mirror 7 is currently opened. This information is used to adjust an alignment of the light pattern 1 in relation to the vehicle environment. It can thus be guaranteed that the light pattern 1 is always projected into the environment such that the navigation instructions comprised by the light pattern 1 also actually point in the direction of the navigation target 4.

In FIG. 2, the light pattern 1 comprises a symbol 5 in the form of an arrow. The arrow points in the direction of the navigation target 4, whereupon the person can quickly and easily perceive in which direction they must continue to move to the navigation target 4. The navigation target 4 is symbolized by a target flag in FIGS. 2 and 3.

Corresponding to an advantageous development of the method according to the invention, the light pattern 1 or a part of the light pattern 1 can also be animated. For example, the arrow depicted in FIG. 2 can also continue to move in the direction of the navigation target 4. This is symbolized by an arrow with a solid line and an arrow with a dashed line. The arrow with the solid line can thus continue to move to the position of the arrow with the dashed line. Using animations, the person can understand even more quickly and more intuitively in which direction they must continue to move to reach the navigation target 4.

However, if the person does not simply park their vehicle 2 "down the street", and in some instances has had to turn off into one or several roads in order to find a free parking space 11, navigation instructions in the form of a simple arrow are no longer sufficient to tell the person how they can reach the navigation target 4 on foot.

Using a map 6 depicted in FIG. 3, however, the person can also be given instructions in complex parking situations for how to reach the navigation target 4. The map 6 depicted in FIG. 3 shows a comparatively small map section, which is however sufficient for the person to understand which route 15 they must select to reach the navigation target 4. The map 6 can be abstracted in any way. For example, the map 6 can comprise only roads 13, the vehicle 2 and the navigation target 4. Road names can also be depicted in the form of text.

However, the map 6 can also comprise additional information, for example information that the route 15 leads over the respective road 13 at two points. This is symbolized by two cross-hatched areas 16. The cross-hatched areas 16 can, for example, be the region of a traffic light or a pedestrian crossing. The light pattern 1 can also have animations here. Thus, for example, the cross-hatched areas 16 can flash and/or the individual lines that make up the route 15 can move in the direction of the navigation target 4.

Information can also be represented about how far away the navigation target 4 is currently from the vehicle 2. Such information can, for example, comprise time information, e.g., "3 minutes on foot", and/or a route length, e.g., "500 meters". If the person is in a hurry, they can thus estimate whether an appointment can still be kept in time, or whether they may arrive too late.

In order to make the route more convenient for the person, points of interest (POI) can, for example, be recorded in the map 6. If, for example, a café is on the route 15 to the navigation target 4, then the person can even buy a coffee there.

When they are originally programming the navigation route into the navigation device 9 of the vehicle 2, the person can determine with what level of abstraction the light pattern 1 should transmit the navigation instructions. The person can thus meet their own requirements for the depiction of navigation instructions after the vehicle 2 has been parked.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:
   projecting, at least one projector comprised by a vehicle, at least one light pattern into a vehicle environment with a fixed orientation; and
   determining an opening angle of a door of the vehicle,
   wherein the at least one light pattern comprises navigation instructions for continued navigation in a form of a route to be selected for reaching a navigation target, in order to point a person in a direction of the navigation target after parking the vehicle,
   wherein the at least one projector is integrated into a wing mirror of a door of the vehicle, and
   wherein an alignment of the at least one light pattern relative to the vehicle environment is adjusted to project into the vehicle environment with the fixed orientation based on the determined angle of opening of the door.

2. The method of claim 1, wherein the at least one light pattern includes text, at least one symbol, or at least one map.

3. The method of claim 1, wherein the at least one light pattern is projected onto a base surface.

4. The method of claim 1, wherein at least a part of the at least one light pattern is animated.

5. The method of claim 1, wherein the door opening angle is recorded by an angle sensor or by evaluating camera images generated with a camera integrated into the wing mirror.

6. A vehicle, comprising:
   a wing mirror;
   at least one projector integrated into the wing mirror;
   a navigation device; and
   a computer coupled to the at least one projector and the navigation device, wherein the computer is configured to control the at least one projector to project at least one light pattern into a vehicle environment with a fixed orientation,
   wherein the at least one light pattern comprises navigation instructions for continued navigation in a form of a route to be selected for reaching a navigation target, in order to point a person in a direction of the navigation target after parking the vehicle,
   wherein the computer is configured to determine an opening angle of a door of the vehicle,
   wherein the computer is configured to control the at least one projector to adjust an alignment of the at least one light pattern relative to the vehicle environment to project the at least one light pattern into the vehicle environment with the fixed orientation based on an angle of opening of the door.

7. The vehicle of claim 6, wherein the at least one light pattern includes text, at least one symbol, or at least one map.

8. The vehicle of claim 7, wherein the at least one light pattern is projected onto a base surface.

9. The vehicle of claim 8, wherein at least a part of the at least one light pattern is animated.

10. The vehicle of claim 6, further comprising:
    an angle sensor configured to determine the opening angle of the door.

11. The vehicle of claim 6, further comprising:
    a camera integrated into the wing mirror, wherein the computer is configured to determine the opening angle of the door using images from the camera.

* * * * *